UNITED STATES PATENT OFFICE.

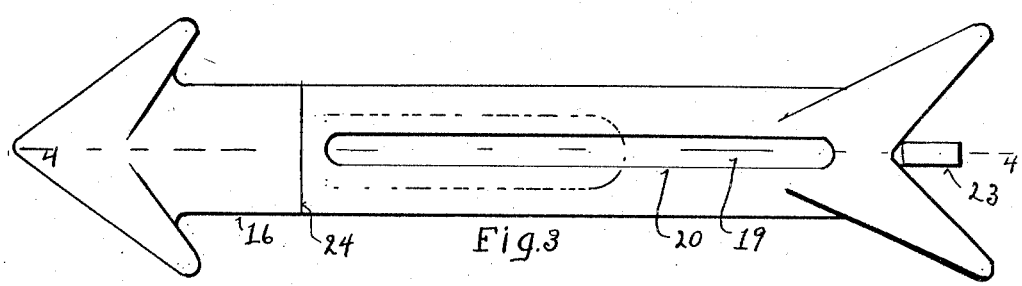
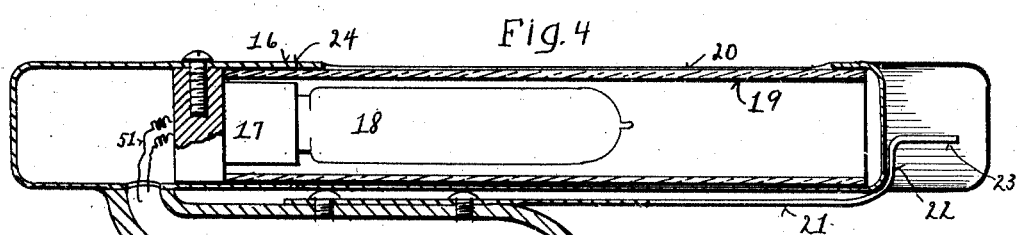
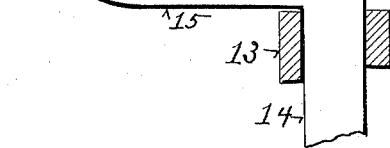
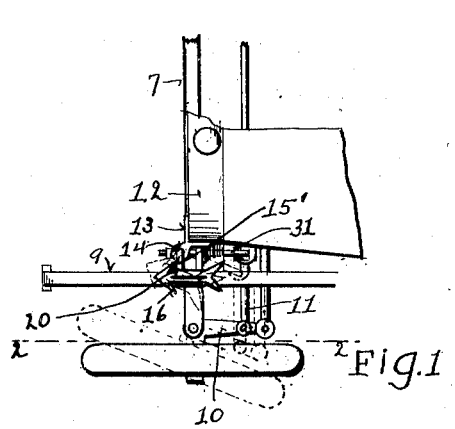
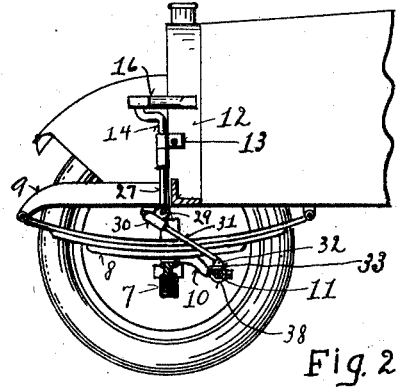

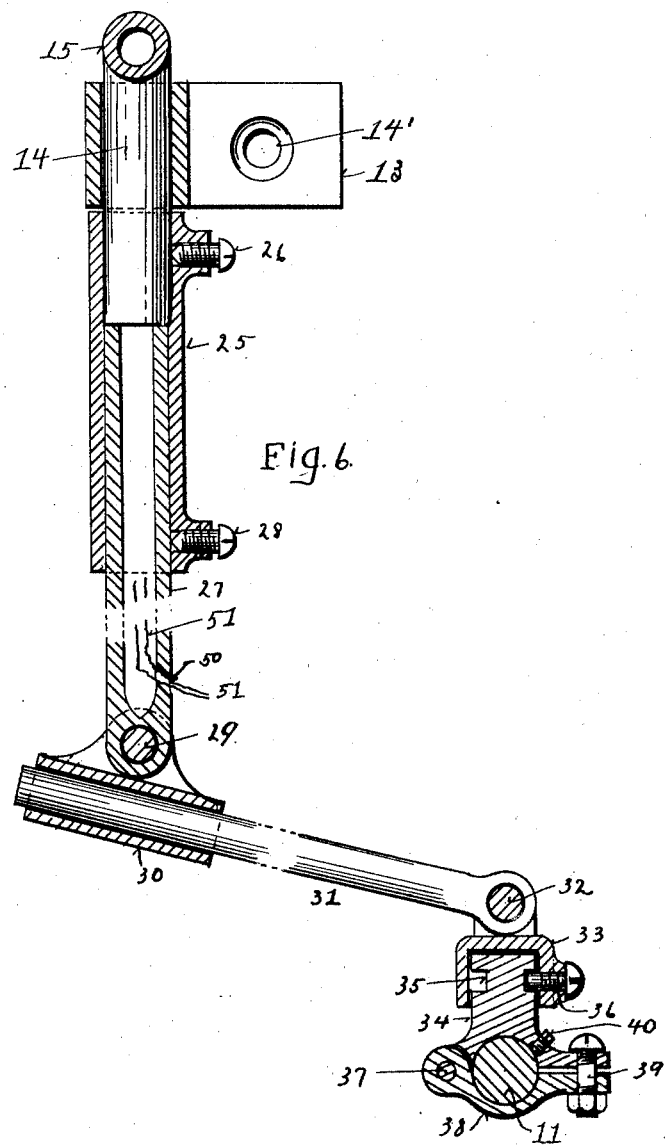

LOUIS H. HOUK, OF TULSA, OKLAHOMA.

AUTOMOBILE-WHEEL INDICATOR.

1,360,111.  Specification of Letters Patent.  Patented Nov. 23, 1920.

Application filed March 16, 1920. Serial No. 366,216.

*To all whom it may concern:*

Be it known that I, LOUIS H. HOUK, citizen of the United States, residing at Tulsa, in the county of Tulsa and State of Oklahoma, have invented certain new and useful Improvements in Automobile-Wheel Indicators, of which the following is a specification.

My invention relates to devices used on automobiles for indicating the direction of the front wheels. The object is to provide an indicator of this kind which has a light so that it is clearly visible in the darkness; also to improve upon the articulation between the indicator element proper and the connection with the steering apparatus, so as to provide against injury to the device itself and to insure proper indication notwithstanding the differential movement between the body and the front axle.

My invention consists of certain elements making the indicator visible in the darkness and to certain elements in the connecting mechanism between the indicator proper and the connecting rod of the steering mechanism; and it further consists of certain parts, improvements and combinations as hereinafter set forth and claimed.

In the drawings accompanying and forming part of this specification and in the description of the drawings, I have shown my invention in its preferred form and what I deem to be the best mode of applying the principles thereof; and it is to be understood that, within the scope of the appended claims, I contemplate changes in form, proportions and materials, the transposition of parts and the substitution of equivalent members, without departing from the spirit of my invention.

Figure 1 is a plan view of the forward left-hand corner of an automobile, the fender being removed, and showing my invention attached thereto. Fig. 2 is a view of my device in side elevation applied to the automobile which is shown in sectional elevation approximately on a plane indicated by the line 2—2 in Fig. 1. Fig. 3 is an enlarged plan of the indicating element proper, namely, an arrow of special design and construction. Fig. 4 is a longitudinal sectional elevation of the same on a plane indicated by the line 4—4 in Fig. 3. Fig. 5 is a view of the upper portion of the pivot rod showing in particular the offset. Fig. 6 is a sectional elevation of my device, certain parts being broken away, this view showing in particular the articulation between the arrow pivot-rod and the connecting rod to which my device is attached.

Similar reference characters indicate like or corresponding parts throughout the several views.

Referring first to Figs. 1 and 2, showing some of the well known parts of the automobile more directly concerned in the understanding of my invention:

7 is the front axle, and 8 is one of the springs. 9 is one of the side beams of the frame, 10 is one of the arms on the wheel spindle portion of the knuckle joint, and 11 is the connecting rod connecting the arms of the two front wheel knuckles. 12 is the radiator casing at the front of the hood.

My invention has its support on the radiator casing by means of a bearing bracket 16, which is provided with screw holes 14' (see Fig. 6), and which is secured to the radiator by means of screws 15', the bracket being shaped to embrace the corner of the radiator. Vertically mounted in the bearing of the bracket is a hollow stem or rod 14 formed with an offset 15 immediately above the bearing and corresponding substantially with the offset of the wheel from the spindle of the knuckle joint. Secured to the upper end of the stem or rod is an indicator of arrow shape 16, the rear portion of which, is detachable, the division being made at 24. Within the forward portion is an electric lamp socket 17 to receive a lamp 18. Within the shaft portion of the arrow is a glass tube 19, and in the upper side of the arrow is an elongated slot, which extends in a direction corresponding with the length of the arrow. Secured to the stem is a spring 21 having a hook 22 and thumb piece 23, to hold the assembled parts of the arrow and to permit the removal of the glass tube and rear section of the arrow to give access to the lamp.

The stem 14 extends below the bearing bracket and is there engaged by a long sleeve 25, secured by means of a set-screw 26, and secured in the lower end of the sleeve is an extension of the stem, 27, secured by means of a set-screw 28. The latter connection permits vertical adjustment of the stem to conform it, as may be required, to different cars, while the offset portion and the upper end of the sleeve form snug thrust bearings to hold the stem against vertical movement in the bearing.

To the lower end of the stem is pivoted a sleeve 30 at 29, so as to give the sleeve a swing in a vertical plane extending from front to rear of the car; and within said sleeve is held, both rotatably and slidably, the forward end of a round rod 31, whose rear end is similarly pivoted to a cap 33, at 32. The cap is mounted on a post 34 formed with an annular channel 35 in which extends the inner end of the pin 36 in the cap, thus permitting rotary motion in a vertical plane of the cap. The post is formed so as to clamp the upper side of a connecting rod 11, while the clamping member 38, hinged thereto at 37, clamps the under side, the two clamping members being held tightly on the rod by means of the bolt 39, and as an additional precautionary element, by a pointed set-screw 40.

The parts are so attached to the automobile and adjusted that when the front wheels point or are directed straight ahead, the arrow points similarly, and when the wheels are turned, the arrow turns with them; and the offset 15 serves to give a more pronounced and accurate indication, especially in view of the fact that the stem is substantially above the front axle.

For use in the darkness, the lamp is lighted, the current being carried thereto by means of wires extending from the lamp through the stem and out through the hole 50, as shown at 51.

Inasmuch as cars are designed of different shapes as to radiators, front axles, springs and parts involved, it will be understood that the adaptability of my invention to modifications of design of bracket and stems, will be advantageous.

The purpose of the two pivots giving vertical swing to the rod 31 at both ends and of the slidable and rotatable mounting of said rod in the sleeve 30, is to compensate for the relative movement of the body to the front axle and wheels, without injuring the parts or moving the arrow, which will respond only to lengthwise movement of the connecting rod, and thus be an accurate indicator of the position and direction of the front wheels.

Preferably the arrow is mounted rather low between the hood and the fender on the left side of the car, where it will be easily visible to the driver; and in this location, too, the lighted slot will be more clearly and easily visible to the driver at night, without interfering with his view ahead.

What I claim is:

1. The combination of a bearing bracket formed to be attached to an automobile body above the front axle, a stem vertically mounted therein and formed at its upper end with an indicating element and with an offset between said vertical bearing and said indicating element corresponding substantially with the offset of the front wheels, a sleeve pivoted to the lower end of said stem so as to have a swing in a vertical plane from front to rear, a rod rotatably and slidably engaged at its forward end in said sleeve, a post having a horizontal annular channel, means for rigidly securing the post to the connecting rod of the automobile steering mechanism, and a cap mounted on said post and having a pin engaging in said channel, the rear end of said rod being pivoted to said cap so as to have a swing in a vertical plane from front to rear.

2. The combination of a bearing bracket formed to be attached to an automobile body above the front axle, a stem vertically mounted therein and formed at its upper end with an indicating element and with an offset between said vertical bearing and said indicating element corresponding substantially with the offset of the front wheels, a bracket adapted to be attached to the connecting rod of the steering mechanism for the front wheels, and a rod connecting the lower end of said stem and said last named bracket, both of said connections being pivotal so as to give a swing in a vertical plane between the connections, one of said connections being also adapted to give rotary motion of the last named rod with relation to one of said elements, one of said connections being also adapted to give said rod longitudinal movement with relation to one of said last named elements, and the connection between the two rods being pivotal so as to give a swing in a horizontal plane.

3. The combination of a bracket formed to be attached to an automobile body above the front axle, a stem mounted vertically therein and formed at its upper end with an indicating element and with an offset between said bearing and said element and corresponding substantially with the offset of the front wheels, and suitable connections between said stem and the front wheel steering mechanism for causing the stem to oscillate in unison with the wheel.

4. The combination of a bearing bracket formed to be attached to an automobile body above the front axle, a stem mounted vertically therein and formed at its upper end with a hollow indicating element having a slot extending parallel with the front wheels and said indicating element being offset from said bearing in substantial accord with the offset of the front wheels from their vertical spindles, a lamp within said indicating element, and means connecting said stem with the steering mechanism of the automobile for transmitting the action of the front wheels on their vertical spindles to said indicating element.

In testimony whereof I have hereunto affixed my signature.

LOUIS H. HOUK.